United States Patent
Jones

Patent Number: 5,207,920
Date of Patent: May 4, 1993

[54] CENTRIFUGAL FLOTATION SEPARATOR

[76] Inventor: Raymond Jones, 827 W. 24 Ave., Anchorage, Ak. 99503

[21] Appl. No.: 856,837

[22] Filed: Mar. 23, 1992

Related U.S. Application Data

[63] Continuation-in-part of Ser. No. 730,089, Jul. 15, 1991.

[51] Int. Cl.$^5$ .............. B01D 17/038; B01D 17/035; C02F 1/24; B03D 1/14
[52] U.S. Cl. ........................... 210/703; 210/788; 210/540; 210/221.2; 210/512.1; 210/512.3; 210/532.1; 209/164; 209/170; 209/211
[58] Field of Search ............... 209/211, 170, 164; 210/221.2, 532.1, 221.1, 788, 703, 540, 512.1, 512.3; 137/578

[56] References Cited

U.S. PATENT DOCUMENTS

| | | | |
|---|---|---|---|
| 3,311,129 | 3/1967 | Binder | 137/578 |
| 3,452,870 | 7/1969 | Katsuta | 209/170 |
| 4,094,783 | 6/1978 | Jackson | 210/221.2 |
| 4,186,094 | 1/1980 | Hellberg | 210/221.2 |
| 4,214,982 | 7/1980 | Pfalzer | 209/170 |
| 4,341,630 | 7/1982 | Mackrle | 210/221.2 |
| 4,399,028 | 8/1983 | Kile | 210/221.2 |
| 4,512,888 | 4/1985 | Flynn | 210/221.2 |
| 4,795,561 | 1/1989 | Aslin | |
| 4,952,308 | 8/1990 | Chamberlain | 210/221.2 |
| 4,990,246 | 2/1991 | Blazejczak | 209/169 |
| 5,022,984 | 6/1991 | Pimley | 210/221.2 |

FOREIGN PATENT DOCUMENTS

| | | | |
|---|---|---|---|
| 3812105 | 3/1978 | Fed. Rep. of Germany | |
| 2727398 | 1/1979 | Fed. Rep. of Germany | |
| 3417327 | 11/1985 | Fed. Rep. of Germany | 209/170 |
| 411907 | 3/1972 | U.S.S.R. | 209/169 |
| 1049113 | 10/1983 | U.S.S.R. | |
| 1217483 | 3/1986 | U.S.S.R. | 209/170 |
| 1544496 | 2/1990 | U.S.S.R. | |
| 1614854 | 12/1990 | U.S.S.R. | 209/170 |
| 2162092 | 1/1986 | United Kingdom | |

Primary Examiner—Thomas M. Lithgow

[57] ABSTRACT

A highly versatile fluids and particulate separator that can be used in a centrifugal mode or centrifugal with gas flotation mode without the use of rotating apparatus within the cell. A pump and recirculation system provide the means for centrifugal force and gas flotation. A buoyant self adjusting discharge assembly with a vortex of fluids surrounding it provide the exit path for separated light fluids and light particles. In oil and water separation the buoyant assembly allows self discharge of the oil and can be used with high oil to water ratios at high volume. Oil spill cleanup is possible. Conversely gas flotation may be used for low volume separating applications.

14 Claims, 2 Drawing Sheets

CENTRIFUGAL FLOTATION SEPARATOR

This application is a Continuation In Part of application Ser. No. 07/730,089 filed Jul. 15, 1991.

BACKGROUND OF THE INVENTION

This invention relates generally to the separation of fluids of differing specific gravity with or without contaminates of solid particulate from fluid solutions. More particularly, this invention relates to removal of oil and particulate intermixed with water contained in a storage tank continually receiving water intermixed with oil and particulate of approximately minus 200 mesh with some minus 60 mesh coming from a ground pollution washplant operation. This required continual removal of pollution products from the water in the storage tank. A search for a device suitable to treat the polluted water reveled only costly, intricate apparatus prone to mechanical problems, maintenance problems, expensive filters to replace, etc. It appeared that the answer to the problem would be two separators, a centrifugal separator and a flotation separator. This was unacceptable. U.S. Pat. Nos. 4,175,040 and 4,534,860 describe centrifugal oil separators, one being complex and the other relatively simple. U.S. Pat. No. 4,534,862 describe apparatus for flotation and the mechanics of bubble and particle attachment. It is possible to separate oil and fine particulate from fluid solutions by flotation but typical apparatus is slow, large and cumbersome. Nothing suitable was found for the specific requirements necessary.

The invention uses no rotating apparatus or bearings within the cell, eliminating mechanical malfunction, is low cost, easily built, with no complex adjustments. A pump, preferably with a variable speed drive provides the power to operate the separator. The invention is not limited to any specific separation process. It is usable as a centrifugal separator alone or flotation separator using gas. Due to the simple design and capacity it is intended for use as a primary or head end separator. Others skilled in the art would find the invention useful in different applications in other fields of industry.

SUMMARY OF THE INVENTION

The subject of this invention is therefore an apparatus for separation of fluids and particulate from fluid solutions using centrifugal force with or without gas flotation. The object of the invention is to provide a separator with a minimal amount of moving parts minimizing mechanical malfunctions. Another object is to provide a separator with optional separation means having a minimal amount of adjustments and retain flexibility under different separating requirements and conditions.

DESCRIPTION OF THE DRAWINGS

Reference to FIGS. 1 and 2 will make the description of the invention more fully understood.

DETAILED DESCRIPTION OF THE PREFERRED EMBODIMENTS

Figure 1:
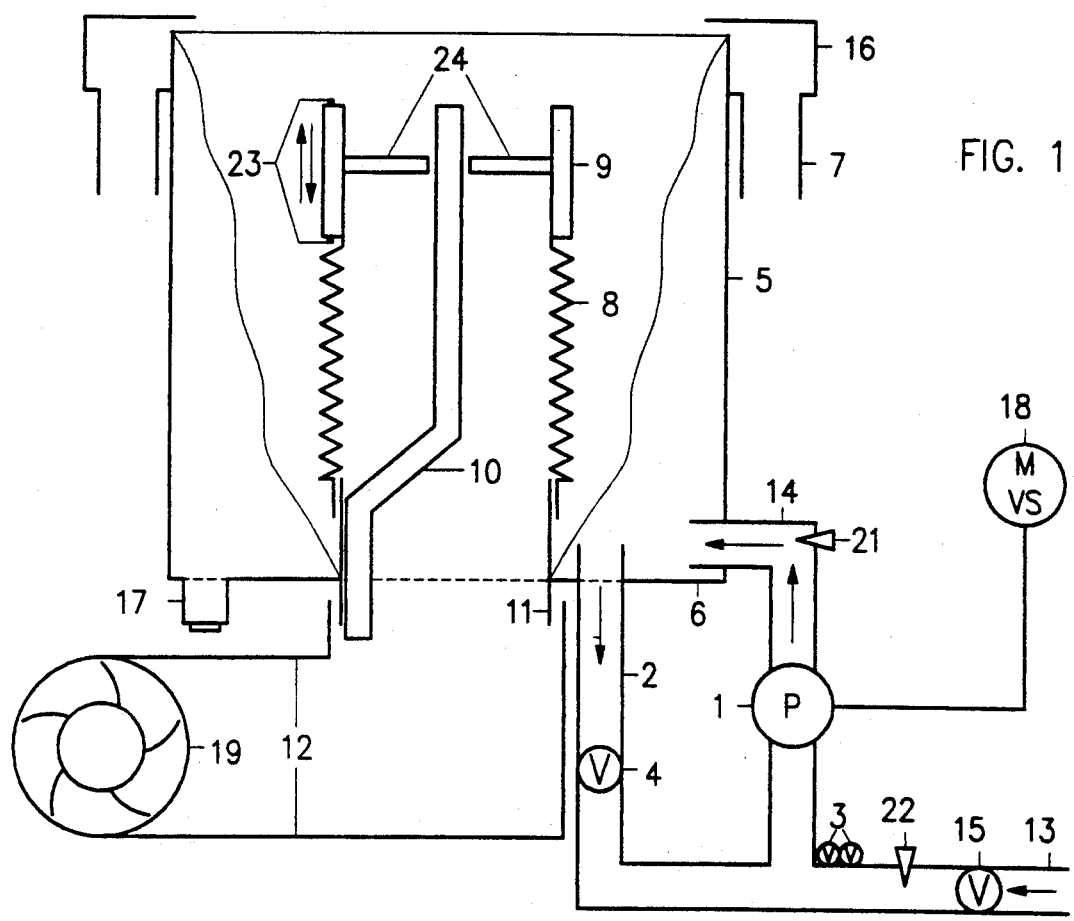
FIG. 1 is a cross sectional view.
Figure 2:
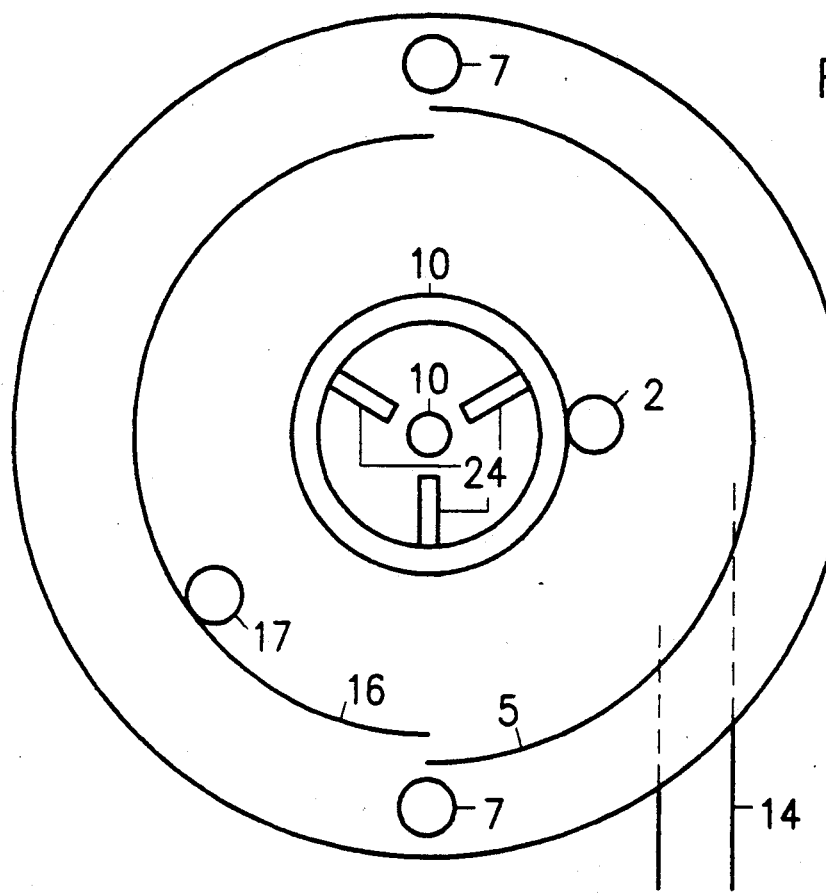
FIG. 2 is a top view.

The use of the word "fluid" and "fluids" in the specification and claims is intended to have the same meaning as "liquid" or "liquid solutions" for descriptive and functional purposes.

The invention in drawings 1 and 2 is comprised of vertical elongated vessel 5 defining a cylinder, pump means to supply fluids into at least one input tube 14 attached adjacent the lower periphery of the vessel 5, entering horizontally at a tangent. The input tube diameter is reduced at the entrance to the vessel to gain vertical fluid velocity. More than one input tube can be used to obtain fluid velocity more efficiently, reducing the danger of forming emulsions. A nozzle with a sealing cap 21 is attached to input tube 14 for injection of gas or chemicals. The circular bottom plate 6 has an aperture in the center, an aperture adjacent the center aperture and an aperture adjacent the outer periphery. A launder 16 circumscribes the upper outer periphery of the elongated vessel 5 for collection of discharged high specific gravity fluids and high density particulate. Tangential outlet tubes could be used in place of a launder but they cause a turbulence at the tube around outer periphery, degrading performance of the separation. At least one conduit means 7, such as a flexible hose is attached to the launder 16 for transportation of the fluids and particulate to a desired place. A contaminate trap 17 with a drain plug is attached to the outer aperture in bottom plate 6. A vertically oriented annular discharge assembly is comprised of annular frame member 11, defining a annular cylinder, a vertically oriented guide rod 10 is attached in the center of the vertical axis of cylinder 11, the lower portion formed with an offset and fixedly attached onto the inner wall of frame member 11. Buoyant annular upper member 9 comprises two elongate cylinders, the inner cylinder being less in diameter than the outer cylinder, leaving a substantial annular space between the walls, the annular space is closed at the top bottom with flat plates cut to fit the annular space between the walls and fixedly attached airtight. Holes are drilled and tapped for pipe plugs 23 in the top and bottom flat plates between the inner and outer walls for adding or removing fluid from the annular space, forming an airtight annular space within the inner and outer walls of buoyant cylinder 9. This arrangement enables buoyant cylinder 9 to float in fluid mixtures and allows the specific gravity of buoyant cylinder 9 to be changed. The inner wall of cylinder 9 is made longer than the outer wall, leaving the inner wall projecting out past the outer wall some on one end, defining a buoyant annular double wall cylinder having a sealed annular space between the walls with an inner wall projection on one end. The inner wall of 9 has a plurality of short members 24 attached midway between the top and bottom to allow a loose fit with rod 10, restricting horizontal movement of 9, yet allowing 9 to have some tilt off the vertical axis should the separator move of vertical plumb, such as would occur if the separator were installed on a sea going vessel. The loose fit between 9 and 10 allows the separator to operate reliably during vertical angle changes of the vessel. Member 8 is an annular collapsible member, collapsible in the vertical axis, defining a circular bellows, and is attached to the upper outer periphery of annular cylinder 11 and the remaining end of annular collapsible member 8 is attached to the outer periphery of the projecting inner wall of buoyant annular cylinder 9. Annular cylinder 11 penetrates and is attached vertically to the center aperture of bottom plate 6 in the center of vertical axis of vessel 5, the vertical guide rod 10 restricts horizontal movement of the annular collapsible member 8 and buoyant annular cylinder 9. The discharge assembly is watertight around the outer periphery and annular the full length, the arrangement allows a vertical movement of cylinder 9 at least one third the height of vessel 5.

Due to the buoyancy provided by the closed annular space within the inner and outer walls in cylinder 9, a vertical annular discharge assembly that is self adjusting in vertical height in accordance with the fluid level surrounding cylinder 9 is provided. There is a slight resistance to vertical movement of cylinder 9 presented by the bellows and cylinder 9 is made with more buoyancy than would be necessary and than weighted to the operating specific gravity, isolating it somewhat from the bellows resistance to movement. Vertical movement stability of 9 is aided by the weighting. The discharge assembly components are arranged and assembled to allow the upper end of cylinder 9 to reach slightly above the upper edge of vessel 5. A deep vortex can be formed during operation and the lower limit of travel of cylinder 9 is taken into consideration also. The minimum usable vertical travel of cylinder 9 should be at least one third the height of the vessel. In the event of operation stoppage or malfunction no liquid flow down the discharge assembly is possible. Some vortex is normally present during operation and in the event of stoppage or malfunction the fluid drops as the vortex subsides and no fluid flow is possible at the outer discharge launder 16.

The discharge assembly is somewhat synergistic in the fact that it is self leveling in fluids and can also self discharge low specific gravity fluids being separated from high specific gravity fluids because the specific gravity of cylinder 9 can be adjusted to approximately the point of equilibrium between the high and low specific gravity fluids wherein the top of cylinder 9 will float above the high specific gravity fluid and the top will sink below the surface of the low specific gravity fluid. For example; in the separation of oil from water the buoyant cylinder 9 would be adjusted by weighting with fluid thru plug 23 hole for the top to float an inch or two of its height above the water, the fluid velocity is adjusted to have a vortex form, as oil starts to build up in the vortex the oil does not displace any significant amount of area of cylinder 9 and due to the lower specific gravity the oil will not float cylinder 9 upwards at the same rate as the water would and cylinder 9 does not float any significant amount higher, consequently after a certain amount of oil buildup in the vortex surrounding annular cylinder 9 the oil reaches the top of cylinder 9 and flows over the top and into the annular discharge assembly and out of the vessel. No gas charging of the fluids or foam flotation is necessary, the oil will self discharge out of separator thru the central discharge assembly. The only requirement is that some vortex be used, there will always be some oil remaining in the vortex. This particular advantage of the discharge assembly being able to self discharge lighter fluids allows the separator to be used as a stand alone centrifugal separator for fluids of differing specific gravity without the use of flotation. Separation at high oil to water ratios, high volume with respect to vessel size can be accomplished, such as needed in oil spill cleanup. For flotation use of the separator an air or gas eductor arrangement (not shown in the drawings) can be used with the tangential inlet tube for charging the fluids with gas, an old method well known those skilled in the art and requiring no further explanation. A conduit 12 is attached to the lower end of frame member 11 for transportation of separated foam and fluids coming down the discharge assembly from within the elongate vessel, the other end of conduit 12 is connected to the intake of a centrifugal air blower 19. The outlet of blower 19 has a filter holder for plastic or stainless steel strand filter or cellular filter attached to the air outlet. The blower 19 is the removal means for the foam from within the vessel and the filter helps to break down and dehydrate the foam. If a centrifugal pump is used for pump 1 it can be modified for air or gas sparging by removal of the bowl surrounding the impellers and all the impeller drilled with holes thru the flat portion near the outer end uniformly to retain balance. This is not shown in the drawings, those skilled in the art know the construction of pumps, the size and amount of the holes are optional, but in a five horsepower closed impeller water pump about five one sixteenth inch holes per blade thru the flat part is all that is required, pumps differ in rpm, number of impellers, diameter, head design, ect., and one must use their own judgment on the holes. The holes cause increased slip when air is admitted into into the pump and consequently decreases efficiency of the pump 1 somewhat and also causes some internal turbulence that decreases the efficiency somewhat more. The loss of efficiency is offset by gaining an efficient small bubble-fluid dispersion apparatus necessary in flotation separation. There is little noticeable internal turbulence or loss in efficiency when no air is used. The capacity of the pump 1 is taken into consideration due to the foregoing factors. The modified pump would be useful for particle separation and some immiscible liquid solutions. A low turbulence pump must be used for fluid separations if a danger of mixing or forming an emulsion exist. The pump 1 is powered with a variable speed drive 18 to adjust operating conditions. The pressure outlet port of pump 1 is attached to input tube 14. An adjustable intake flow control valve is attached to pump 1 intake port. The pump 1 intake port also has plurality of spring loaded, self closing, self aspiration valves 3 attached, the valves provided with sealing caps, providing a means for admittance of air or gas when needed or all valves 3 capped off when no air or gas is needed. An intake tube 13 is attached to intake flow control valve 15. A nozzle 22 with a sealing cap is attached to intake tube 13, providing a point for admittance of gas or chemicals. Valve 15 controls fluid supply to pump 1 intake port, and controls suction at pump 1 intake port, thereby effecting operation of valves 3 when they are in use. A recirculation tube 2 is attached and penetrates the remaining aperture in the bottom plate 6, extending vertically into the elongate cylinder 5 a short distance from the bottom adjacent to the cylinder frame member 11. The other end of recirculation tube 2 is attached to adjustable valve 4. Valve 4 is also attached to pump 1 intake port. Various plumbing fittings are required. Recirculation of the solution is normally necessary or there would be an excessive amount of solution flow thru the separator and little time for adequate separation to occur. Valve 4 controls the amount of recirculation flow of fluid solution and also effects the centrifugal force developed, the depth of the vortex and the amount of solution processed in a given time. Adjustment of valve 15 and variable drive 18 cooperates with valve 4 to achieve the desired operating conditions. At start up of operation the weight of buoyant cylinder 9 is adjusted until about one or two inches of the top of 9 floats above the highest specific gravity fluid in the vessel, valves 3 should be capped off, variable drive 18 at low speed, valve 4 open more than valve 15 to let the solution build up gradually, adjusting variable drive 18, valves 4 and 15 until a vortex forms, continuing adjustments until desired results are obtained. During flotation separation normally only a small amount of foam is necessary for satisfactory separation. Many contaminants in solutions will foam without gas, if not gas is admitted thru valves 3. Nozzles 21 and 22 normally capped off can be used for admittance of gas or chemicals such as flotation foaming agents, foam suppressing agents or flocking agents.

The foregoing description of the preferred embodiment of the invention has been presented for the purposes of illustration and description. It is not intended to be exhaustive or to limit the invention to the precise form disclosed. Other modifications and variations are possible in light of the above teaching. Some other embodiments will be suggested that have merit and should be considered.

An optional foam skimmer blade can be made for flotation. The blade is flat, light weight material, easy to form and has a long slot on one end, attached to a bracket that also has a slot, and a pin engages the two slots, together forming a sliding pivot hinged arrangement. The other end of blade is curved on the bottom edge to conform as well as possible with the annular opening of buoyant cylinder and be able to follow the vertical movement of the buoyant cylinder, the bracket attaches to the top of launder. The rotation of the fluid causes the foam to rotate also and the blade deflects the foam into the cylinder.

A top cover for the vessel could be made from a round flat plate slightly larger in diameter than the vessel, attached with brackets to the side wall, leaving about a one half inch gap between the cover and the top outer periphery of the vessel. The cover would be particularly usefull for a seagoing vessel installation.

An adapter with a plurality of spiral grooves circumscribing the upper outer periphery and extending over the top to the inner wall could be made that fits over the top of buoyant cylinder 9 of the discharge assembly, the groves being in the direction and angle that would enable rotating fluids to climb up and over the top and flow down the inside of buoyant cylinder 9. The adapter would enable separation of substantially all the low specific gravity fluids remaining in the vortex without the use of foam or flotation and could be made for fast installation and removal.

An anulus made of flat plate circumscribing the upper inner periphery of elongate cylinder 5 reducing the inner diameter of the elongate cylinder 5 would enable increasing fluid velocity, thus increasing centrifugal force of the fluid, possibly obtaining more complete separation, however the lip would be a barrier for heavier solids rotating around the inner wall, unable to exit the separator and a buildup of solids would occur, therefore no solutions containing solids could be processed. If the anulus angled upwards toward the inner diameter the solids could exit.

Another embodiment is a conical shape elongate cylinder 5 that would enable solutions containing a high volume of heavy solids to flow over the outer edge due to centrifugal force. An anulus reducing the inner diameter with a steep upward angle toward the inner diameter could be useful in restricting the solids somewhat slowing their exit and allowing more separating time should they be contaminated with oil or other contaminates.

Using a frusto-conical shape elongate cylinder 5 allows lower fluid inlet velocity and retains the ability to form a deep vortex due to the increasing fluid velocity as the fluid moves upward into a decreasing diameter cylinder. This shape would allow fluids prone to emulsion or mixing to be pumped at a lower velocity and may be the best shape vessel for separating oil and water or other combinations of fluids. Recirculation of part of the separated discharged fluid from the launder 16 could be arranged by adding a conduit and valve between the the recirculation tube and the receiving point of the fluids that have been discharged into the launder allowing selection of fluid in the recirculation circuit. This would benefit the separation percentages of fluids and be of particular value if used with a frusto-conical shape vessel. Reducing the recirculation fluid flow from within the vessel correspondingly reduces the depth of vortex formed in a cylindrical vessel so recirculation of discharged fluid would work well with a frusto-conical shape vessel that forms a vortex easily.

What is claimed is:

1. An apparatus for separating intermixed fluids and particulates containing high specific gravity fluid and low specific gravity fluid including fluid containing particulate of varying density including those of high density and those of low density comprising:
    (a) a vertically oriented elongate vessel, wherein the shape of said elongate vessel is selected from the group consisting of cylindrical, conical and frusto-conical;
    (b) at least one tangential inlet tube means fixedly attached to the lower portion of the vessel wall for receiving fluids supplied to said elongate vessel;
    (c) a pump means for supplying said fluids into said tangential inlet tube means with sufficient velocity to create a centrifugal force field of said fluids, including the formation of a vortex of said fluids within said elongate vessel;
    (d) a gas intake means for admittance of gas into said pump means, said gas forming foam for collection of said particulate and said low specific gravity fluid contained in said elongate vessel;
    (e) a vertically oriented annular discharge assembly having buoyancy means for self adjustment in the height of said annular discharge assembly in accordance with the depth of a vortex formed of said fluids surrounding the discharge assembly and being located substantially along a vertical axis defined by said vessel, said annular discharge assembly penetrating the bottom out to the exterior of said elongate vessel;
    (f) said discharge assembly further comprising conduit means connected to said buoyancy means for transporting said low specific gravity fluid, said foam and said low density particulate;
    (g) collection means at the top of the elongate vessel and above said annular discharge assembly for receiving said high specific gravity fluid and said high density particulate being discharged directly from the upper outer periphery of said elongate vessel.

2. The apparatus of claim 1 wherein:
    (a) said collection means comprise a launder circumscribing the outer periphery of said elongate vessel for receiving of said high specific gravity fluid and said high density particulate from the vessel, said launder fixedly attached to the top of said elongate vessel;
    (b) at least one outlet tube means for transport of said high specific gravity fluid and said high density particulate penetrating into and fixedly attached to said launder;

(c) intake valve means for flow control of said intermixed fluids fixedly attached to said intake tube means;

(d) said gas intake means for admittance of said gas into said pump means being at least one self aspiration valve, said self aspiration valve is fixedly attached to said intake tube means, said gas being used to create gas bubbles therein said fluids, said gas bubbles therein said fluids result in forming foam on the surface of said fluids charged with said gas therein said elongate vessel.

3. The apparatus of claim 1 wherein said annular discharge assembly further comprises;

(a) a buoyant annular upper member which is part of said buoyancy means and said member having a sealed annular space within an inner and outer wall, said sealed annular space having at least one air tight removable plug means for adding and removal of fluid from said sealed annular space, therein providing means for changing the specific gravity of said buoyant annular upper member, said buoyant annular upper member is attached to one end of an annular collapsible member, the other end of said collapsible member being attached to an annular frame member, said annular frame member penetrating and fixedly attached to the bottom in the center of the vertical axis of said elongate vessel;

(b) a vertically oriented guide rod, being fixedly attached to the inner periphery of said annular frame member, said annular collapsible member and said buoyant annular member being placed thereover said guide rod to restrict horizontal movement of said annular collapsible member and said buoyant annular member;

(c) said conduit means having one end fixedly attached to the bottom of said annular frame member for transport of said low specific gravity fluid, said foam and said low density particulate from said annular discharge assembly;

(d) a centrifugal air blower means for removal of said foam from said conduit means, the air intake of the blower means being fixedly attached to said conduit means.

4. The apparatus of claim 3 wherein the specific gravity of the said buoyant annular upper member is approximately between the specific gravity of said high specific gravity fluid and said low specific gravity fluid contained within said elongate vessel.

5. The apparatus of claim 1 further comprising a fluid recirculation means for pumping a controllable portion of said fluids from said elongate vessel back thru said pump means to said inlet tube means.

6. The apparatus of claim 5 wherein said fluid recirculation means comprise a recirculation tube, one end of said recirculation tube enters said elongate vessel thru the bottom of the vessel and fixedly attached to the bottom of said elongate vessel, the remaining end of said recirculation tube being fixedly attached to an adjustable recirculation control valve, said recirculation control valve being attached to said pump means.

7. The apparatus of claim 1 wherein said pump means motive force is variable.

8. The apparatus of claim 1 wherein said pump means comprise a centrifugal pump having impeller blades, said impeller blades having a plurality of holes therein adjacent to the outer periphery of said impeller blades.

9. The apparatus of claim 3 wherein said buoyant member of said annular discharge assembly has a plurality of inclined grooves circumscribing the outer periphery of said buoyant member, the angle of said grooves being set to permit vortically flowing fluid of low specific gravity to climb up and over said buoyant member and into the interior of said annular discharge assembly.

10. The apparatus of claim 8 wherein said elongate vessel has an annulus circumscribing the inner wall of the vessel, said annulas inner diameter being substantially less then the vessel inner diameter and attached to said inner wall of said elongate vessel adjacent to the top.

11. A method of separating high specific gravity liquid and high density particulate from low specific gravity liquid and low density particulate existing in a liquid mixture, comprising the steps of:

(a) pumping said mixture into a vertical elongate vessel thru a tangential inlet tube means, thereby forcing the mixture into a circulating mass, thereby producing a centrifugal force field of liquid within said vertical elongate vessel, said pumping means having means for charging said liquid mixture with gas bubbles resulting in a foam mixture on the surface of said liquid mixture, said foam mixture containing said low density particulate and said low specific gravity liquid therein, said pumping means operating at sufficient pressure to create sufficient velocity of the said liquid mixture to create a vortex within said vertical elongate vessel; said vertical elongate vessel having a vertically oriented annular discharge assembly having buoyant means for self adjustment in the height of said annular discharge assembly in accordance with said liquid mixture surrounding said annular discharge assembly;

(b) having the top of said discharge assembly achieve a position in said vortex wherein the top of said annular discharge assembly is slightly above the said high specific gravity liquid;

(c) having the higher specific gravity liquid and higher density particulate migrate to the outer periphery of said elongate vessel where said high specific gravity liquid and said high density particulate are removed directly through an outlet which is at the upper outer periphery of said elongate vessel and above said annular discharge assembly;

(d) having said low specific gravity liquid and said foam mixture migrate toward the bottom of the vortex where they are discharged into said annular discharge assembly.

12. The method of claim 11 further comprising the steps of recirculating a portion of said liquid mixture from said elongate vessel back through said pumping means and back into the vessel.

13. A method of separating high specific gravity liquid from a lower specific gravity liquid existing in a liquid mixture and having a centrifugal force field of said liquid mixture be the separating means comprising the steps of:

(a) pump means pumping said mixture into a vertical elongate vessel thru a tangential inlet tube means, thereby forcing the liquid mixture into a circulating mass, thereby producing a centrifugal force field of liquid mixture within said elongate vessel, said pump means having means for operating at sufficient pressure to create sufficient velocity of the said liquid mixture to create a vortex within said vertical elongate vessel, said elongate vessel having a vertically oriented annular discharge assembly having buoyant means for self adjustment in the height of said annular discharge assembly in accordance with said liquid mixture surrounding said annular discharge assembly;

(b) having the top of the discharge assembly achieve a position in said vortex wherein the top of said annular discharge assembly is slightly above the said high specific gravity liquid;

(c) having said high specific gravity liquid migrate to the outer periphery of said vertical elongate vessel where said high specific gravity liquid is removed directly through an outlet which is at the upper outer periphery of said elongate vessel and above said annular discharge assembly;

(d) having said low specific gravity liquid migrate toward the bottom of the vortex where they are discharged into said annular discharge assembly.

14. The method of claim 13 further comprising the steps of recirculating a portion of said liquid mixture from said vertical elongate vessel back through said pumping means and back into said vertical elongate vessel.

* * * * *